US006575318B2

(12) United States Patent
Stowasser et al.

(10) Patent No.: US 6,575,318 B2
(45) Date of Patent: Jun. 10, 2003

(54) LOCKING UNIT FOR A TELESCOPIC JIB OF A CRANE AND TELESCOPIC JIB

(75) Inventors: Walter Stowasser, Zweibrücken (DE); Klaus Meissner, Zweibrücken (DE); Hans Brenner, Zweibrücken (DE); Klaus Conrad, Hornbach (DE); Thomas Krebs, Blieskastel (DE); Michael Irsch, Lebach (DE); Jens Fery, Ensdorf (DE)

(73) Assignee: Atecs Mannesmann AG, Düsseldorf (DE)

( * ) Notice: Subject to any disclaimer, the term of this patent is extended or adjusted under 35 U.S.C. 154(b) by 0 days.

(21) Appl. No.: 10/024,078

(22) Filed: Dec. 17, 2001

(65) Prior Publication Data

US 2002/0056693 A1 May 16, 2002

Related U.S. Application Data

(63) Continuation of application No. 09/956,671, filed on Sep. 20, 2001.

(30) Foreign Application Priority Data

Sep. 21, 2000 (DE) ........................................ 100 48 224
Mar. 23, 2001 (DE) ........................................ 201 05 578

(51) Int. Cl.[7] ............................................ B60C 23/687

(52) U.S. Cl. ...................... 212/292; 212/348; 212/349; 52/118

(58) Field of Search ................................ 212/292, 348, 212/349; 52/118

(56) References Cited

U.S. PATENT DOCUMENTS

| | | | | | |
|---|---|---|---|---|---|
| 2,923,381 | A | * | 2/1960 | Wilkinson et al. | 189/14 |
| 3,464,169 | A | * | 9/1969 | Potain | 52/118 |
| 3,670,465 | A | * | 6/1972 | Cheze | 52/118 |
| 3,727,359 | A | * | 4/1973 | Vonck | 212/292 |
| 3,921,819 | A | * | 11/1975 | Spain | 52/118 |
| 4,036,372 | A | * | 7/1977 | Rao et al. | 52/118 |
| 4,490,951 | A | * | 1/1985 | Mentzer et al. | 212/268 |
| 5,628,416 | A | * | 5/1997 | Frommelt et al. | 212/292 |
| 6,164,468 | A | * | 12/2000 | Erdmann | 212/348 |
| 6,189,712 | B1 | * | 2/2001 | Conrad et al. | 212/292 |
| 6,206,213 | B1 | * | 3/2001 | Conrad | 212/292 |

* cited by examiner

*Primary Examiner*—Thomas J. Brahan
(74) *Attorney, Agent, or Firm*—Cohen, Pontani, Lieberman & Pavane

(57) ABSTRACT

A locking unit for a telescopic system of a hydraulically actuated telescopic jib of a crane, having a jib box frame and a plurality of telescopic sections which are guided inside one another and can be moved out of a starting position into in each case at least one extended position is provided with a drive for moving at least one driver bolt of a locking unit into and out of a section receptive driver bolt opening, and for moving a coupling device for displacement of at least one locking bolt into and out of a locking bolt receptive opening, the drive being arranged fixedly on the box frame of the jib, there being a mechanical drive connection between the drive and the locking unit.

15 Claims, 4 Drawing Sheets

LOCKING UNIT FOR A TELESCOPIC JIB OF A CRANE AND TELESCOPIC JIB

This is a continuation of U.S. patent application Ser. No. 09/956,671, filed Sep. 20, 2001.

BACKGROUND OF THE INVENTION

1. Field of the Invention

The present invention relates to a locking unit for a telescopic system of a hydraulically actuated telescopic jib of a crane having a jib box frame and a plurality of telecopic sections guided one inside another and moveable from a starting section position to an extended position, and to a telescopic jib.

2. Description of the Related Art

EP 0 661 234 A1 and counterpart U.S. Pat. No. 5,628,416 discloses a crane with a telescopic jib which has at least one box frame in which a plurality of telescopic sections of the jib are arranged, these sections being extendable from a starting position into, in each case, one extended position. In the starting position, the individual sections which are guided inside one another are secured to one another and/or to the box frame of the jib by means of a locking bolt. The extension and retraction of the individual sections is in each case effected by a single-stage piston-cylinder unit, which is releasably coupled to the section which is to be displaced by means of a locking unit. This coupling is effected by means of two driver bolts of the locking unit, which can be introduced in a positively locking manner into corresponding locking openings in the section which is to be moved. The driver bolts are held in the locking position by spring preloading and can be pulled out of the locking position, in order to be uncoupled in each case from the moved section of the jib, by means of a mechanism which is actuated by a hydraulic cylinder of the locking unit. The locking unit is equipped with a coupling device which can move relative to the locking unit and by means of which the respective locking bolt can be gripped and pulled out of the locking opening. The locking bolt, like the driver bolt, is held in the locking opening by spring preloading and is unlocked counter to the spring force by the coupling device. A hydraulic drive by a piston-cylinder unit is provided for the unlocking movement of the coupling device. In this known crane, the free end of the piston rod of the single-stage piston-cylinder unit which is provided for movement of the individual sections is attached to the lower end (with respect to the working position) of the telescopic jib, while the locking unit is attached to the extendable cylinder housing (telescopic cylinder) of the piston-cylinder unit.

A telescopic system with a single-stage telescopic cylinder unit which functions in a similar way is known from EP 0 943 580 A2 and its counterpart U.S. Pat. No. 6,216,895. This system, however, does not use a single locking bolt to secure the individual sections to one another, but rather a pair of locking bolts which in each case engage in locking openings arranged in the side faces of the individual sections. The locking bolts lie opposite one another with respect to the longitudinal axis of the jib. To actuate the locking bolts, which are likewise held in the locking position under spring preloading, there is a separate hydraulic piston/cylinder unit, which acts on the locking bolts via a lever system.

DE 198 24 671 A1 and its counterpart U.S. Pat. No. 6,189,712 discloses a telescopic crane, the sections of which can be moved telescopically by a single hydraulic piston-cylinder system. In this case, the displaceable part of the piston-cylinder system, i.e. either the piston rod or the cylinder housing, is equipped with two locking units, one of which is arranged at the upper end of the displaceable part and the other of which is arranged at the lower end of the displaceable part. This makes it possible to considerably shorten the length of the piston-cylinder system with respect to the required length in the solution described in EP 0 661 234 B1 or EP 0 943 580 A2, for example to shorten this length by half. However, in this case the extension of a section is carried out in two steps; in the first step, the lower locking unit is used, and in the second step the upper locking unit is used. The reverse is true when retracting a section. In this known solution, the locking unit once again has two driver bolts which lie opposite one another and is designed to actuate an individual locking bolt for each section. In this case, the driver bolts and the locking bolt are actuated via a common drive of a hydraulic piston-cylinder system on the locking unit. This piston-cylinder system acts, via a cam-controlled mechanism, to convert the linear movement on the driver bolts and the locking bolt in such a manner that the locking bolt can only be unlocked when the two driver bolts have been introduced into the respective driver openings of the section which is to be moved. Conversely, the driver bolts can only be pulled out of the driver openings of the section in question when the locking bolt is in its locked position. This ensures that there can be no uncontrolled extension or retraction of a section without the guidance provided by the hydraulic telescopic piston-cylinder unit.

These known solutions have the drawback that, to actuate the locking units, which are fixedly connected to the movable part of the telescopic piston-cylinder system, it is necessary to provide hydraulic feedlines leading to this movable part. This requires a considerable construction and assembly outlay.

SUMMARY OF THE INVENTION

It is an object of the present invention to reduce the outlay involved in actuating a locking unit of the generic type without impairing its operational reliability.

In accordance with the invention, a locking unit for a hydraulically actuated telescopic job of a crane having a jib box frame and a plurality of telescopic sections guided one section inside another and each moveable along a jib axis from a starting position into at least one extended position is provided with an actuating means for displacing the telescopic sections, the locking unit being fixedly connected to the actuating means and including at least one driver bolt. A drive is operable to displace the driver bolt along said axis for introducing said driver bolt into a driver bolt opening in the telescopic section. A coupling device is arranged with the locking unit and the drive is operable to move the coupling device relative to the locking unit. Each section is provided with an axially displaceable locking bolt receptive in a locking opening for fixing a section in a locking position such that it, (the section) cannot be displaced into one of another section or the box frame. The coupling device is operable to grip and pull the at least one locking bolt out of an associated locking opening. The drive is arranged fixedly on the box frame, and a mechanical drive is connected between the drive and the locking unit.

The essential distinguishing feature of the present invention is that the drive for moving a driver bolt (two driver bolts are preferably provided) and for moving the coupling device in order to displace a locking bolt (two locking bolts are preferably provided) is arranged fixedly on the box frame of the jib and that there is a mechanical drive connection between this drive and the locking unit. Therefore, there are deliberately no hydraulics acting in the locking unit, and consequently the locking unit also does not have to be provided with hydraulic feed lines and outlet lines. It is also unnecessary to provide an electro-mechanical drive in the locking unit, which would require corresponding electrical connection lines to the locking unit. To drive the locking unit, it is preferable to provide a rotary motor drive which is arranged in the region of the lower end of the box frame, the mechanical drive connection comprising a profiled rod, which is arranged substantially parallel to the longitudinal axis of the telescopic jib, for torque transmission. In the locking unit there is a mechanism which converts the rotary movement of the profiled rod into translational movements for the driver bolt(s) and the locking bolt(s). In this case, the profiled rod may be guided slidably in a drive wheel, in particular in a toothed wheel, which is mounted rotatably and in a fixed position on the locking unit. The rotary movement can be converted into the required translational movement for example by a rack drive, on which the drive wheel acts, or a crank drive or a slotted-guide control means.

Instead of a rotary drive movement, it is also possible for the drive, which is arranged outside the locking unit, to execute a sliding movement, which can be transmitted to the locking unit by a connecting rod. During the telescopic movement of a section, this connecting rod may be guided in a sliding manner in the locking unit and, when the desired locking position of the section is reached, can be fixedly connected to a coupling element of the locking unit in order to transmit linear movements. For this purpose, it is advantageously possible to provide a coupling fixture which can be engaged in a positively locking manner, in particular a coupling fixture which is designed as a driver projection and can be engaged by a rotary movement of the connecting rod. Alternatively, the connecting rod may also be of tubular design and the coupling fixture may be in the form of a spreading fixture which, for example, can be actuated mechanically by an actuating rod in the connecting rod, from the lower end of the box frame of the telescopic jib. A spreading fixture of this type could also be activated and deactivated by a rotary movement of the actuating rod.

If, by way of example, two driver bolts are provided, it is advantageous for these bolts to be arranged on opposite sides with respect to the longitudinal axis of the jib. Accordingly, when using two locking bolts these locking bolts should also be arranged on opposite sides of the telescopic jib, preferably in the region of the side faces of the respective section.

To ensure that the drive bolts and the locking bolts are held securely in their locking position when they are not actuated by the locking unit, it is preferable for the locking bolts and driver bolts to be fixed in engagement in the locking opening or driver opening by spring preloading.

A telescopic jib according to the invention has at least one, and preferably two, locking units of the type described above, which are fixedly connected to the actuating means which effects the displacement of the individual telescopic sections, i.e. in the case of hydraulic actuation to the telescopic cylinder or, if appropriate, also to the piston rod of the hydraulic piston-cylinder system. Separate mechanical drives may be provided in this case. Preferably, however, a common mechanical drive for both locking units is provided. In this case, it is particularly expedient to use a torque-transmission means of variable length, for example a telescopic torque-transmission means (e.g. profiled rods or tubes).

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
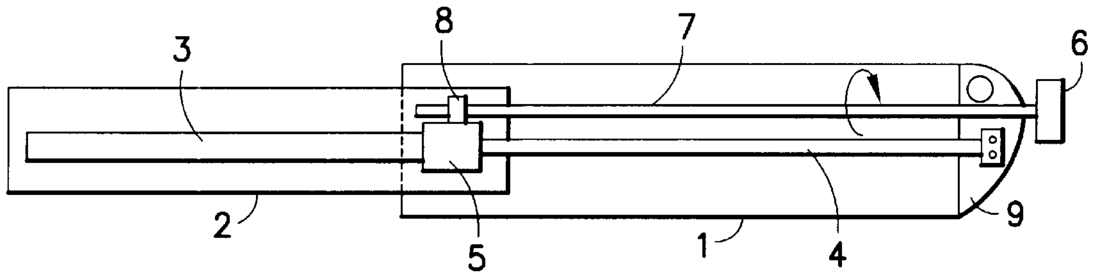
FIG. 1 is a diagramatic depiction of a lateral side of a telescope jib embodying a locking unit in accordance with the invention.
Figure 1A:
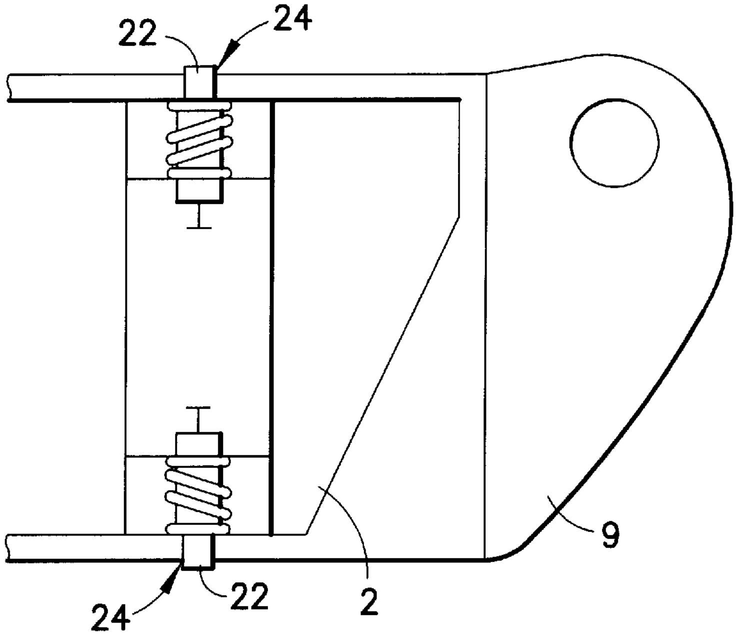
FIG. 1*a* is a detailed view of the lower end of the telescopic jib of FIG. 1.

FIG. 1 shows a lateral section through a telescopic jib, of which only the box frame 1 and a first telescopic section 2 are illustrated. Further sections, which adjoin the section 2, are not shown further for the sake of simplicity. However, U.S. Pat. No. 5,628,416 discloses a plural telescopic jib wherein the sections are guided inside one another and provided with locking bolts, the disclosure of said patent in its entirety being incorporated herein by reference. The lower end, in the working position, of the box frame 1 is denoted by reference numeral 9. A piston rod 4 of a hydraulic piston-cylinder unit for telescopic section extension, is attached to this lower end 9. The cylinder housing of the piston-cylinder unit is denoted by reference number 3. The cylinder housing 3 is the movable part of the piston-cylinder unit, but it is also possible to use a reverse arrangement for the movable part of the piston-cylinder unit. The locking unit 5 according to the invention is attached to the lower end of the movable cylinder housing 3, so that this unit also moves when the hydraulic piston-cylinder unit is actuated. A rotary motor drive 6 (e.g. electric motor or hydraulic motor) is arranged in the region of the lower end of the box frame 1. The torque from this motor 6 can be transmitted by a profiled rod 7. This profiled rod 7 is operatively connected to a mechanism 8 on the locking unit 5. The mechanism 8 converts the rotary movement into corresponding linear movements for actuation of the driver bolts and locking bolts. To enable the locking unit 5 to move with the cylinder housing 3 without problems, the profiled rod 7 is guided in a sliding manner in the mechanism 8. On account of the profiled cross section of the profiled rod 7, it is ensured that it is always possible to transmit the torque produced by the motor 6 to the mechanism 8 (a positive lock). To convert the rotary movement into the movements required for actuation of the locking and driver bolt(s), it is possible, for example, to provide a rack which interacts with a toothed wheel driven by the profiled rod or to provide a crank drive. To realize the securing functions mentioned above (locking of the actuating means of locking and driver bolts), it is possible, for example, to provide slotted-guide control means for converting a rotary movement into translational movements, as known from U.S. Pat. No. 6,189,712, the disclosure of which in its entirety is incorporated herein by reference. It is also possible to use, as is well known, a rack drive or a crank drive for the aforemention conversion of rotary to translational movements.

Figure 2:
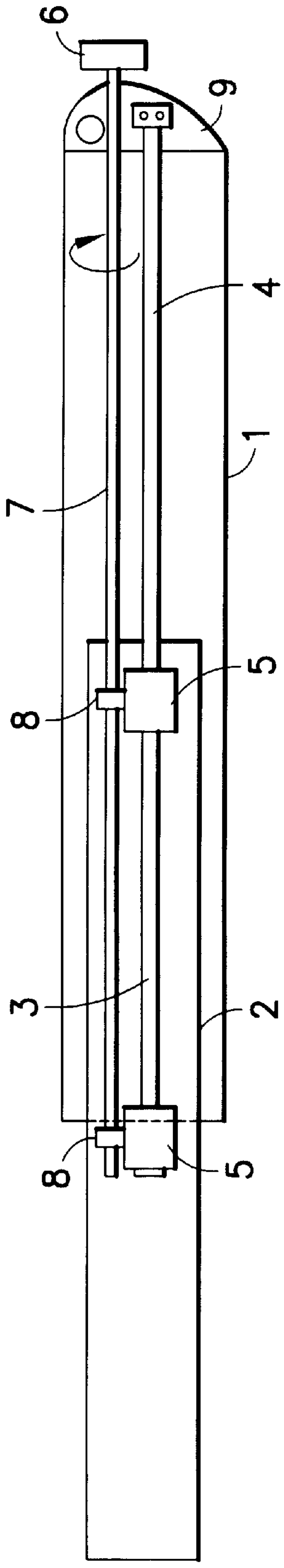
FIG. 2 is a view similar to FIG. 1 of another embodiment of the telescopic jib.

FIG. 2 shows a modified embodiment of the invention, in which parts which have an identical function are in each case provided with the same reference numeral as in FIG. 1. The principal difference consists in the fact that, firstly, the lengths of the cylinder housing 3 and the piston rod 4 do not correspond to the entire length of the box frame 1, but rather only to approximately half the length of the box frame 1, and secondly that there are two locking units 5. Of the latter, one is attached to the upper end of the cylinder housing 3, and the other is attached to the lower end of the cylinder housing 3. These locking units 5 may, as illustrated in FIG. 2, be actuated by a common mechanical drive (rotary drive 8 and profiled rod 7). Instead of a single-part profiled rod 7, it would advantageously also be possible to use a torque-transmission means of variable length, for example in the form of a telescopic profiled-tube or rod element. A further alternative would be two rods which are mechanically coupled to one another in a rotationally fixed manner and interact with the drive 6. Naturally, it would also be possible to set up in each case one completely separate drive connection for each locking unit 5, i.e., for example, to provide two separate profiled rods which lead from a common rotary motor drive or in each a separate rotary motor drive, in the region of the lower end of the box frame 1, to the respective locking unit 5. Naturally it is also possible for the locking units 5 illustrated in FIG. 2 to be arranged so as to function appropriately if the reverse arrangement of the piston-cylinder unit is used, i.e. the cylinder housing 3 is secured in the region of the lower end of the box frame 1. In such a case, one locking unit 5 may be directly connected to the extendable end of the piston rod 4, while the second locking unit 5 is indirectly coupled to the piston rod 4 via a holding means (e.g. in the form of tie rods), which runs on the outer side of the piston rod 4 parallel to and at a distance therefrom, in the direction of the lower end of the box frame 1, so that this second (lower) locking unit is guided past the outside of the stationary cylinder housing 3 when the piston rod 4 is retracted and extended.

FIG. 1 a shows a detailed view of the lower end 9 of the box frame 1 with the first telescopic section 2 fully inserted. The first telescopic section 2 includes a locking bolt 22 which is spring loaded in an opening 24 in the box frame 1 to hold the first telescopic section 2 in place.

Figure 3:
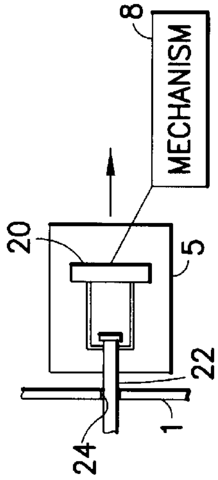
FIG. 3 is a schematic depiction of a coupling device arranged with the locking unit and used for gripping and pulling a locking bolt out of a locking bolt opening.

Referring to FIG. 3, a coupling device 20 is arranged with the locking unit 5. The coupling device 20 moves with the locking unit 5 along the longitudinal axis of the telescopic jib. In addition, the coupling device 20 is moveable relative to the locking unit 5 along the direction indicated by the arrow in FIG. 3 and is used to grip the locking bolt 22 when the coupling device 20 is aligned therewith and pull it out of a bolt associated opening 24 in, e.g., the box frame, to disconnect the first telescopic section 2 from the box frame. The pulling out is effected against the bias of a spring holding, e.g., the locking bolt in locked position.

Figure 1B:
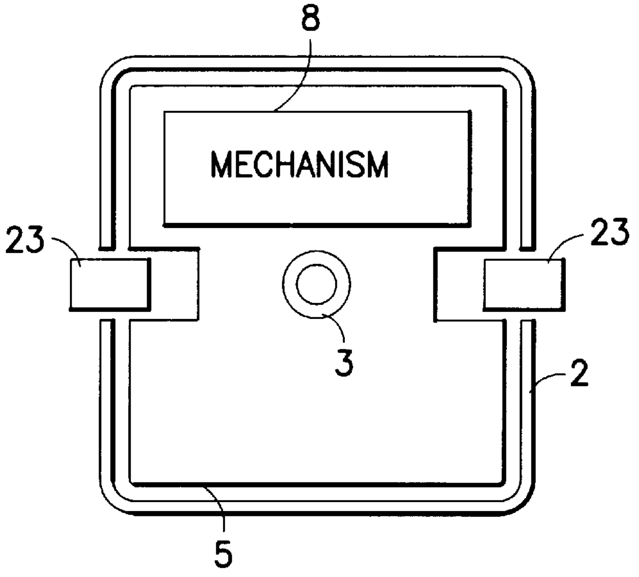
FIG. 1*b* is a schematic sectional view of the locking unit of FIG. 1.

FIG. 1*b* is a sectional view of the locking unit showing driver bolts 23 connected to the mechanism 8. The locking unit 5 is connected to the cylinder so that it moves with the cylinder. The driver bolts 23 are used to selectively connect the locking unit 5 to the first telescopic section 2 for moving the first telescopic section 2 relative to the box frame.

Figure 4:
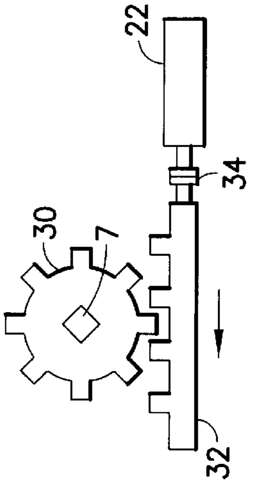
FIG. 4 is a schematic showing of a toothed drive wheel employed with a mechanism to convert rotary movement to translative movements of the locking bolts and of driver bolts.

For converting rotary drive to a linear movement with mechanism 8 and as shown in FIG. 4, a toothed drive wheel 30 is used to engage a rack 32 and drive it in a linear direction. The rack is couplable with a spring preloaded locking bolt 22 as at 34 so the bolt can be drawn from an associated locking opening against the preloading. Profiled rod 7 is guided slidably in drive wheel 30. A similar mechanism 8 may be used to couple and uncouple the driver bolts.

Figure 5:
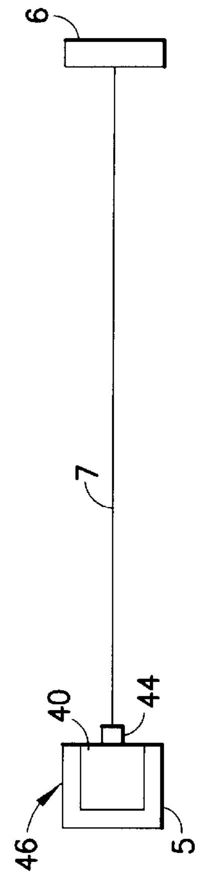
FIG. 5 is a schematic showing of a coupling element arrangement used when the drive executes a sliding movement transmitted to the locking unit via a connecting rod which is fixedly connected to the coupling element to transmit linear movement.

FIG. 5 schematically depicts a coupling element 40 arranged with locking unit 5 and used where drive 6 executes a sliding movement. A connecting rod 7 transmits sliding movement, and during a section telescopic movement the connecting rod 7 is guided in the locking unit 5. The connecting rod 7 is fixably connectable to coupling element 40 when the telescopic section is in a locking position in order to transmit linear movements such linear movements being depicted by arrow 46. The engagable connection of connecting rod 7 to coupling element 40 can, e.g., be with a positive locking coupling fixture 44. U.S. Pat. No. 6,189,712 mentioned above shows how a sliding mechanism may be used to operate the locking bolts and drive bolts.

Figure 6:
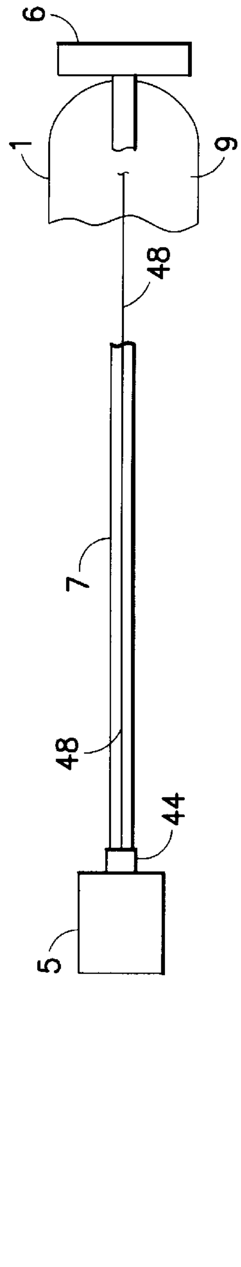
FIG. 6 is a schematic showing of a tubular connecting rod used with a spreading fixture coupling and having an actuating rod mechanically actuating the spreading fixture from a box frame lower end.

As shown in FIG. 6, the connecting rod 7 can be a tubular rod, and can include an actuating rod 48 therein. Coupling fixture 44 can comprise a spreading fixture, and the actuating rod 48 can mechanically actuate the spreading fixture from lower end 9 of the box frame 1. The spreading fixture is a mechanism that expands axially in response to rotation of the actuating rod 48.

Figure 7:
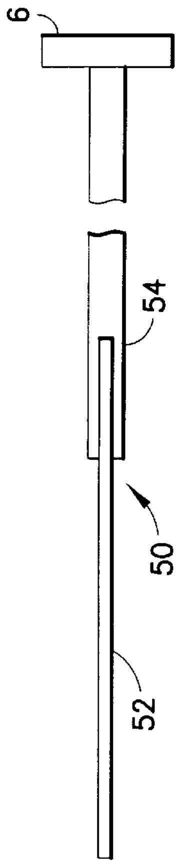
FIG. 7 is a schematic showing of a variable length torque transmission means of a common mechanical drive for actuating two locking units in a telescopic jib.

FIG. 7 depicts the common mechanical drive for actuating the two locking units 5 shown in the FIG. 2 embodiment. The common mechanical drive includes a variable length torque transmission member 50 driven by drive 6. Transmission member 50 includes a first member length 54 attached to drive 6, and a second member length 52 telescopingly moveable within the first member length 54. The transmission members 52, 54 can be of a profiled tube construction, or could be of profiled rod construction having a non-circular section at profile such as the profiled rod 7 shown in FIG. 4.

In accordance with the invention, means are provided for permitting operation of the coupling device 20 to grip and pull out a locking bolt from an associated locking opening only when a driver bolt is received in its associated driver opening, such means being, e.g., of the type disclosed in the above-mentioned U.S. Pat. No. 6,189,712.

The inventive solution of a locking unit has an extremely high degree of operational reliability and does not need any movable hydraulic or electrical lines to be laid in order to supply energy to and control the actuating device and the moveable locking unit.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. In a hydraulically actuated telescopic jib of a crane having a jib box frame and a plurality of telescopic sections guided one section inside another, each of said plural telescopic sections having a driver bolt receptive opening and being moveable along a jib axis from a starting position into at least one extended position, and an actuating means for displacing said telescopic sections between the starting position and the at least one extended position, a locking device comprising:

- a locking unit fixedly connected to said actuating means;
- at least one driver bolt;
- a drive operatively arranged to displace said driver bolt transverse to said jib axis for introducing said at least one driver bolt into one of said driver bolt openings, said drive being mounted on said box frame;
- a coupling device arranged with said locking unit, said drive being operable to move said coupling device relative to said locking unit, each of said plural telescopic sections having at least one axially displaceable locking bolt receptive in a locking opening for fixing a section in a locking position for preventing displacement into one of another larger one of said plural telescopic sections and said box frame, said coupling device being operable to grip and pull said at least one locking bolt out of said locking opening, said drive being arranged fixedly on said box frame; and
- a mechanical drive connection between said drive and said locking unit.

2. A locking device according to claim 1, wherein said drive includes a rotary motor drive arranged proximal a lower end of said box frame, said mechanical drive connection comprising a profiled rod arranged parallel to said jib axis, a rotary movement of said profiled rod transmitting a torque output, said locking unit having a mechanism for converting rotary movement of said profile rod to translative movements of said at least one driver bolt and said at least one locking bolt.

3. A locking device according to claim 2, further comprising a toothed drive wheel rotatably mounted in a fixed position on said locking unit, said profiled rod being guided slidably in said drive wheel.

4. A locking device according to claim 2, wherein said mechanism includes one of a rack drive, a crank drive, and a slotted-guide control means for converting rotary movement into translational movement.

5. A locking device according to claim 1, wherein said drive is one which executes a sliding movement, said mechanical drive connection comprising a connecting rod for transmitting said sliding movement, during a section telescopic movement said connecting rod being guided in said locking unit, said locking unit including a coupling element, said connecting rod being fixably connectable to said coupling element when said section is in said locking position in order to transmit linear movements.

6. A locking device according to claim 5, further comprising a positive locking coupling fixture engageably connecting said connecting rod to said coupling element.

7. A locking device according to claim 6, wherein said coupling fixture comprises a driver projection for engagement with a rotary movement of said connecting rod.

8. A locking device according to claim 6, wherein said connecting rod is a tubular rod, said connecting rod including an actuating rod, said coupling fixture comprising a spreading fixture, said actuating rod mechanically actuating said spreading fixture from a lower end of said box frame.

9. A locking device according to claim 1, wherein said locking unit includes two driver bolts, which are disposed opposite one another with respect to said jib axis.

10. A locking device according to claim 1, wherein each telescopic section has two locking bolts arranged in section side faces disposed opposite one another with respect to said jib axis.

11. A locking device according to claim 1, wherein said at least one locking bolt and said at least one driver bolt when engaged in respective locking and driver openings are maintained in said openings with a spring preloading.

12. A telescopic jib for a crane, comprising:

- a hydraulically actuated telescopic system having a plurality of telescopic sections guided one section inside another, each of said plural telescopic sections having a driver bolt receptive opening and being moveable along a jib axis from a starting position into at least one extended position, and an actuating means for displacing said telescopic sections between the starting position and the at least one extended position, and a locking device comprising:
- a locking unit being fixedly connected to said actuating means;
- at least one driver bolt;
- a drive operatively arranged to displace said driver bolt transverse to said jib axis for introducing said at least one driver bolt into one of said driver bolt openings, said drive being mounted on said box frame;
- a coupling device arranged with said locking unit, said drive being operable to move said coupling device relative to said locking unit, each of said plural telescopic sections having at least one axially displaceable locking bolt receptive in a locking opening for fixing a section in a locking position for preventing displacement into one of another larger one of said plural telescopic sections and said box frame, said coupling device being operable to grip and pull said at least one locking bolt out of said locking opening, said drive being arranged fixedly on said box frame; and
- a mechanical drive connection between said drive and said locking unit.

13. The telescopic jib according to claim 12, wherein said jib includes two locking units fixedly connected to said actuating means.

14. The telescopic jib according to claim 13, said drive comprising a common mechanical drive for actuating each of said locking units.

15. The telescopic jib as claimed in claim 14, wherein said common mechanical drive includes variable length torque-transmission means which is one of a telescopic profiled tube and a telescopic profiled rod.

* * * * *